United States Patent [19]

Foral

[11] 3,912,200

[45] Oct. 14, 1975

[54] SELECTIVE ROTOR BLADE SEVERING APPARATUS

[75] Inventor: Marvin J. Foral, Doylestown, Pa.

[73] Assignee: The United States of America as represented by the Secretary of the Navy, Washington, D.C.

[22] Filed: July 29, 1974

[21] Appl. No.: 492,370

[52] U.S. Cl. .................. 244/17.11; 73/455; 416/2
[51] Int. Cl.² .................................. B64C 27/00
[58] Field of Search........... 244/17.11, 17.13, 17.15, 244/17.25, 17.27, 3.2 S; 416/2; 102/49.5, 70.2 R; 415/9; 73/455

[56] References Cited

UNITED STATES PATENTS

| | | | |
|---|---|---|---|
| 2,362,804 | 11/1944 | Cox | 416/2 |
| 2,701,021 | 2/1955 | Sargent | 416/2 |
| 2,853,010 | 9/1958 | Bianchi et al. | 102/70.2 R X |
| 2,973,164 | 2/1961 | Grill | 244/1 R X |
| 3,067,973 | 12/1962 | Halsey et al. | 102/49.5 X |
| 3,075,741 | 1/1963 | Laubin | 416/2 |
| 3,229,931 | 1/1966 | Larsen | 244/17.11 |
| 3,352,513 | 11/1967 | Baker et al. | 244/17.15 |
| 3,392,524 | 7/1968 | Caveny | 73/35 |
| 3,606,570 | 9/1971 | Haggerty | 416/2 |
| 3,778,008 | 12/1973 | Ingham et al. | 244/17.11 |
| 3,830,109 | 8/1974 | Litvinovich et al. | 73/455 |

FOREIGN PATENTS OR APPLICATIONS 151,936   11/1962   U.S.S.R. ..................... 244/17.11

Primary Examiner—Trygve M. Blix
Assistant Examiner—Galen L. Barefoot
Attorney, Agent, or Firm—R. S. Sciascia; Henry Hansen

[57] ABSTRACT

An emergency rotor blade disconnect system for at least two pairs of opposing helicopter rotor blades. A plurality of parallel wires are embedded in each blade and electrically connected to an explosive squib-actuated rotor blade disconnect at the rotor hub. Breakage of one of the rotor blades along its length initiates an electrical circuit to disconnect the remaining portion thereof from the rotor hub, and also to disconnect the blade opposite to said one blade in order to maintain rotor balance and avoid excessive rotor vibration.

17 Claims, 5 Drawing Figures

SELECTIVE ROTOR BLADE SEVERING APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to the field of aeronautics and more particularly to a selective helicopter rotor blade severing apparatus for maintaining rotor balance after a rotor blade has been broken.

When a helicopter rotor blade is damaged in flight or broken due to naturally occurring physical phenomenon or enemy action in the case of military helicopters, the unbalanced rotor assembly vibrates uncontrollably and destroys the rotor mount. This condition causes rapid loss of helicopter control and means of staying aloft, and results in an immediate descent and crash, affording practically no chance of survival of any occupants. In helicopters having even numbers of blades (i.e., four or six), survival of the occupants could be greatly improved by rapidly correcting the rotor imbalance, allowing the helicopter to continue to operate under its own power with a lesser number of blades. Even in the case of a power loss, the balanced rotor would be capable of auto rotating without excessive vibration during descent, thus providing some amount of lifting force for a softer landing. The time in which rotor balance must be restored is critical. Therefore, automatic means must be provided to reestablish rotor balance in a minimum amount of time after a rotor blade is broken.

SUMMARY OF THE INVENTION

Accordingly, it is a general purpose and object of the present invention to provide apparatus for automatically discarding a broken rotor blade and the blade opposite to said broken blade. It is a further object to automatically disconnect said blades by explosive severing means. It is still a further object to provide apparatus for continuously maintaining helicopter rotor balance.

These and other objects are accomplished according to the present invention by apparatus for automatically jettisoning a rotor blade pair for a helicopter having a plurality of opposing rotor blade pairs attached to a rotor hub comprising severing means formed to be juxtapositioned from each opposing pair of rotor blades adjacent to the hub, and means operatively connected to each of the severing means for selective actuation thereof when one of the rotor blades is discontinuous along its length.

DESCRIPTION OF THE PREFERRED EMBODIMENT

Figure 1:
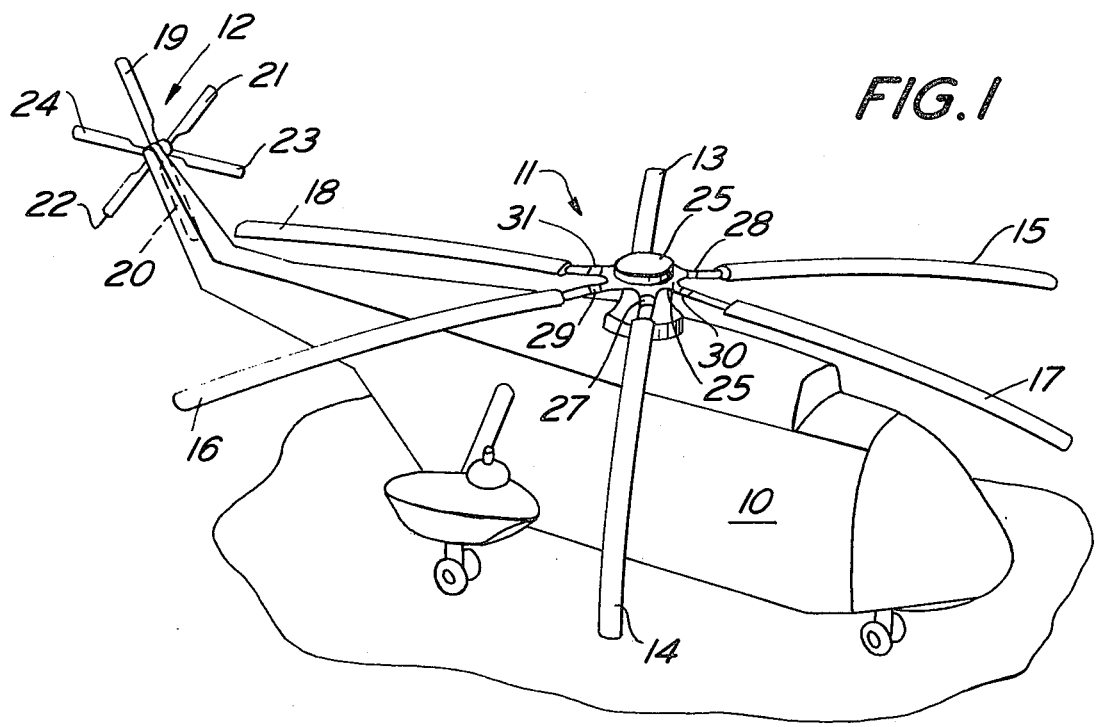
FIG. 1 is a perspective view of a helicopter fitted with the automatic rotor blade severing apparatus constructed according to the invention.

In FIG. 1 there is illustrated an embodiment of the present invention in a helicopter 10 having a main rotor assembly 11 and an auxiliary tail rotor assembly 12. Main rotor assembly 11 has six rotor blades in the present preferred embodiment, disposed in three opposing pairs, 13 and 14, 15 and 16, and 17 and 18, respectively. Tail rotor assembly 12 similarly has three pairs of opposing rotor blades, 19 and 20, 21 and 22, and 23 and 24, respectively. It is to be understood that the present invention is designed to function with any even number of blades of four or more, and that six blades have been chosen in the present preferred embodiment merely for purposes of illustration.

Figure 2:
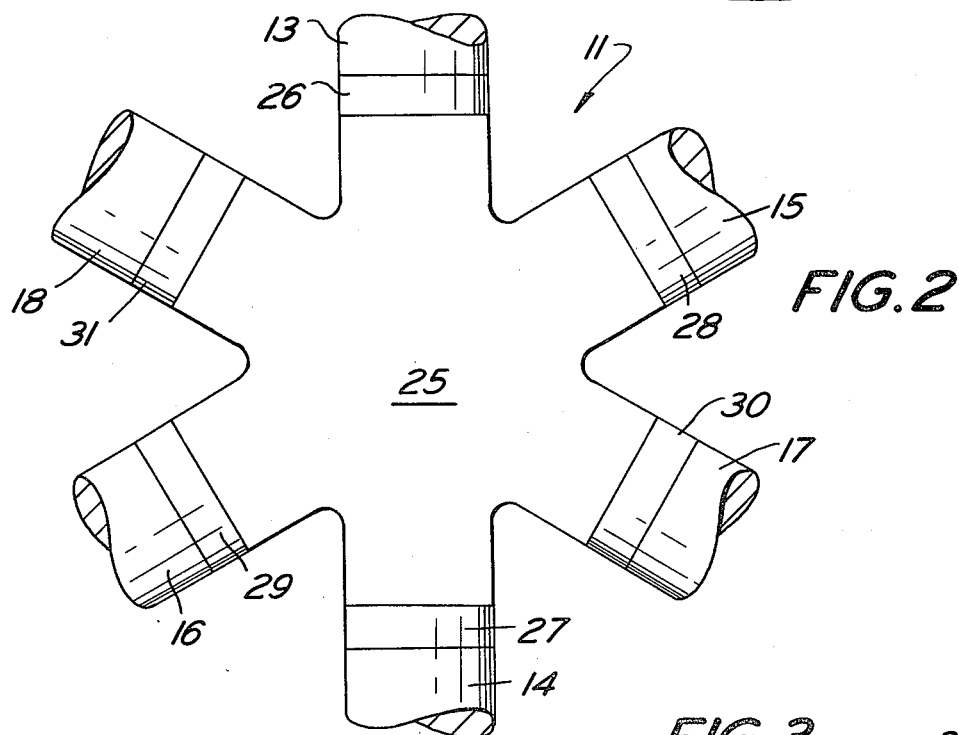
FIG. 2 is a plan view showing the placement of the severing means with respect to the helicopter rotor blades and hub assembly of FIG. 1.

Referring now to FIG. 2, main rotor assembly 11 is shown in greater detail comprising a rotor hub 25 from which each of blades 13–18 extend. Between hub 25 and each blade is a severing device, such as a squib-actuated explosive bolt or linear shaped charge. For example, between hub 25 and blades 13 and 14 are severing devices 26 and 27, respectively; between hub 25 and blades 15 and 16 are severing devices 28 and 29, respectively; and between hub 25 and blades 17 and 18 are severing devices 30 and 31, respectively. Examples of severing devices 26–31 which could be readily adapted for use in the present invention can be found in U.S. Pat. Nos. 3,229,931, 3,352,513, and 3,778,008. Although all of these patents disclose explosive severing devices, it should be understood that any other type of device such as hydraulic, pneumatic or electrically actuated devices, for example, could also be used, while still remaining within the spirit and scope of the present invention.

Figure 3:
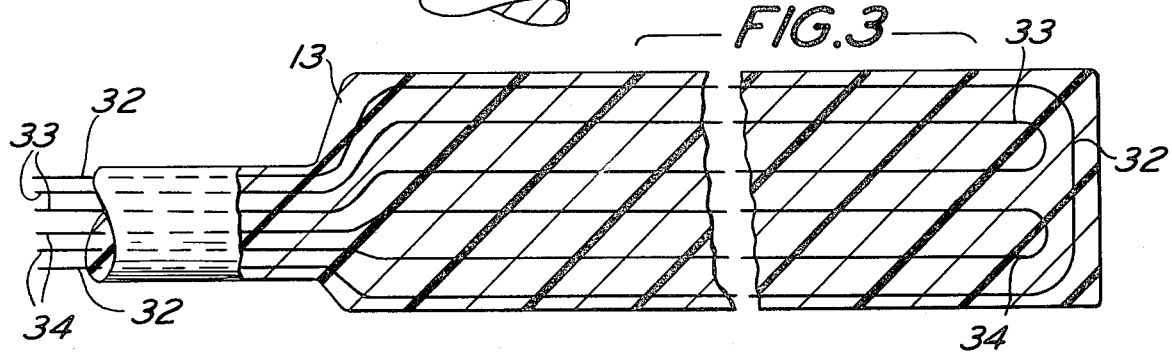
FIG. 3 is a plan view of one of the rotor blades of FIG. 1 showing the sensing wires molded into the blade.

Referring now to FIG. 3, a typical rotor blade such as 13 is shown, having sensing wires 32, 33 and 34 embedded therein. Wire 32 generally extends around the outer periphery of blade 13; wire 33 forms a general loop within one half of blade 13, such as the upper half as shown; and wire 34 forms a similar loop in the other half of blade 13, such as the lower half as shown. The wire arrangement shown is optional, with the underlying principle being coverage over the entire length of blade 13 and across the width therof. Wires 32, 33 and 34 are connected in parallel, so that several of the wires could be severed without interrupting the electrical circuit and causing automatic actuation of severing devices 26–31, inclusive, disconnecting selective pairs of rotor blades from hub 25. As a result of the particular placement of wires 32–34, several bullet holes in any of blades 13–18 would not activate the system, but rather severing of a blade across its entire width would be necessary to activate the automatic severing devices. FIG. 3 shows a typical wire placement of each rotor blade in main rotor assembly 11.

Figure 4:
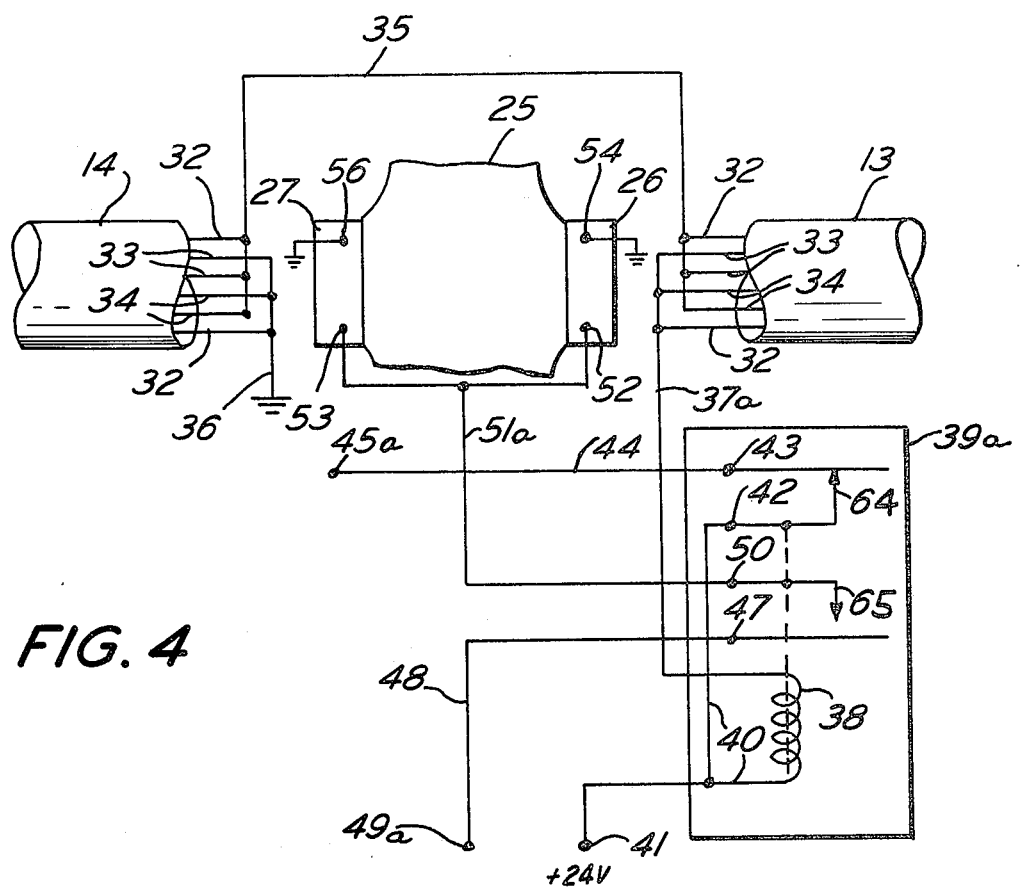
FIG. 4 is a partial plan view of the hub, severing means and rotor blades of FIG. 2 with a schematic diagram of the electrical circuitry for automatic actuation of the severing means.
Figure 5:
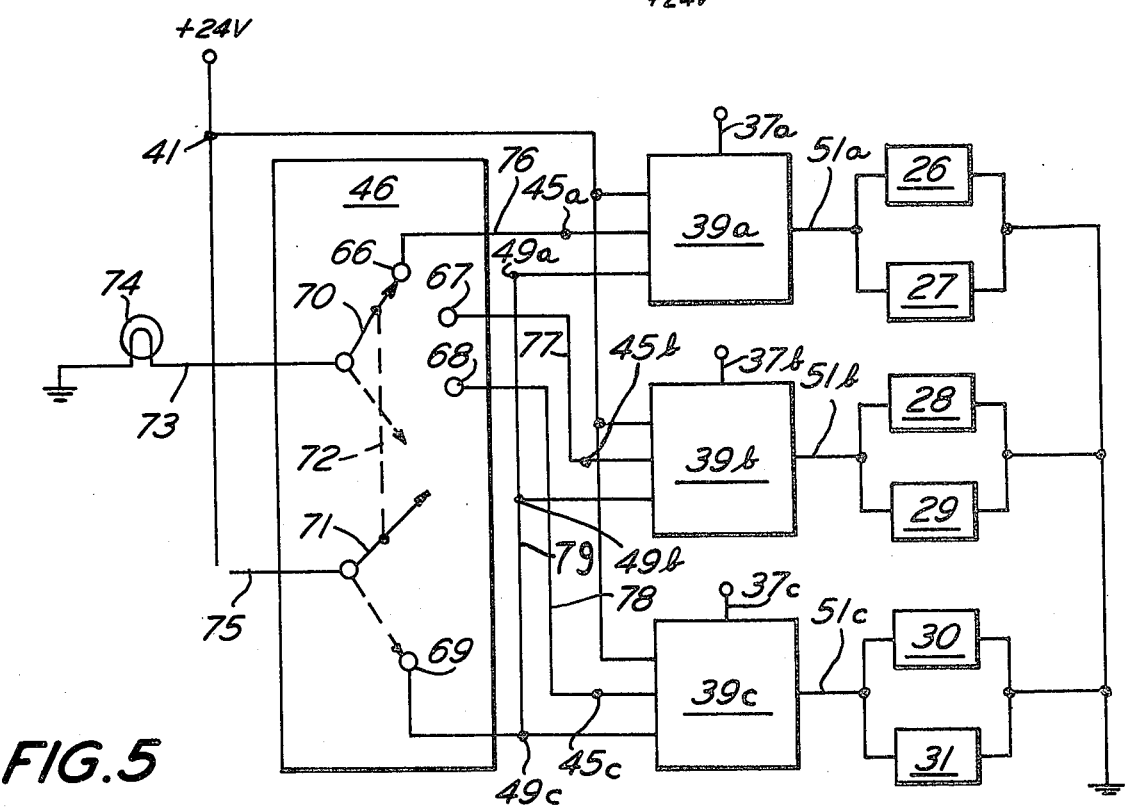
FIG. 5 is a schematic diagram of the apparatus for testing and activating the circuitry of FIG. 4 for each of the rotor blade pairs.

FIG. 4 shows a typical opposing pair of rotor blades, such as 13 and 14, connected in series by a wire 35. Wire 35 is connected in common to respective one ends of wires 32, 33 and 34 on each of blades 13 and 14. The respective other ends of each of wires 32, 33 and 34 on one of the blades 13 or 14 are connected in common to ground by a wire 36, such as on blade 14. The respective other ends of wires 32, 33 and 34 on the opposite rotor blade, such as blade 13, are connected in common by a wire 37a to one end of a coil 38 in a holding relay 39a, which has a set of normally open contacts 64 and normally closed contacts 65. The other end of coil 38 is connected in common by a wire 40 to a terminal 41 of a plus 24 volt power supply and to one terminal 42 of contact set 64. A second terminal 43 of contact set 64 is connected by a wire 44 to a terminal 45a on a test switch 46 (FIG. 5). Contact set 64, which is normally open, is shown in the closed position, as will be more fully described hereinafter in the description of operation. Contact set 65, which is normally closed, is shown in the open position and includes a first terminal 47 connected by a wire 48 to a terminal 49, connected to a contact 69 on test switch 46 (FIG. 5). A second terminal 50 of contact set 65 is connected in common by a wire 51a to a first terminal 52 on severing device 26 and a first terminal 53 on severing device 27. Second terminals 54 on device 26 and 55 on device 27 are each connected to ground. The circut shown in FIG. 4 is for rotor blade pair 13–14. Each additional rotor blade pair requires a separate circuit identical to that shown in FIG. 4, as shown schematically in FIG. 5.

Referring now to FIG. 5, the circuitry for each blade pair, as well as test switch 46 will be described in greater detail. Switch 46, which may be a double pole, four position switch such as a wafer switch, has four contact points 66, 67, 68 and 69, and two contact arms 70 and 71 connected to move in tandem with each other as indicated by dotted line 72. Arm 70 is connected by a wire 73 to an indicator light 74 or any other suitable type of indicating device such as a bell, horn or buzzer, for example, which is attached to ground. Arm 71 is connected by a wire 75 to the plus 24 volt power supply via terminal 41. Contact point 66 is connected to terminal 45a (FIG. 4) by a wire 76; contact point 67 is connected to terminal 45b by a wire 77; and contact point 68 is connected to terminal 45c by a wire 78. Contact point 69 is connected in common to terminals 49a, 49b and 49c by a wire 79. Each respective pair of severing devices 26–27, 28–29 and 30–31, for corresponding blade pairs 13–14, 15–16 and 17–18 include a holding relay 39a, 39b and 39c, respectively, and circuitry identical to that shown in FIG. 4.

Operation of the automatic rotor blades severing apparatus will now be discussed with reference to FIGS. 1 through 5. Prior to helicopter takeoff, the 24 volt power supply is turned on and test switch 46 is turned to the 66 position. Holding relay 39a is actuated, closing normally open contact set 64 and opening normally closed contact set 65. If wires 32, 33 and 34, as well as the remaining relay circuitry shown in FIG. 4 are intact, the plus 24 volts will be applied to terminal 45a, completing the circuit through arm 70 and wire 73 to indicator light 74, causing it to light. This is a positive indication that both of blades 13 and 14 are continuous and the circuitry is intact. Switch 46 is then turned to the 67 position and the same test is performed on rotor blade pair 15–16. Once again a positive indication of rotor blade and electrical circuit integrity is indicated by indicator 74 lighting. The test switch is then turned to position 68 and a similar test is performed on rotor blade pair 17–18. If indicator 74 has lit for each position corresponding to a rotor blade pair, it is then safe to turn test switch 46 to the 69 position connecting terminal 41 to terminal 49 through arm 71, thus enabling the severing devices. It is to be emphasized that extreme caution is to be exercised before placing switch 46 in the 69 position. Indicator light 74 must have lit in each test position relating to a blade pair, or severing devices 26–31 could be inadvertently actuated on the ground causing damage and injury to property and persons nearby. This switch position results in a plus 24 volt supply at terminal 47 of contact set 65 in relay 39a. If wires 32, 33 and 34 should be discontinuous in either blade 13 or 14, coil 38 of relay 39a would be deenergized, opening contact set 64 and closing contact set 65. Plus 24 volts would then be applied through terminal 50 and wire 51a to terminals 52 and 53, respectively, on severing devices 26 and 17, causing instantaneous actuation of these devices. Blades 13 and 14 would be disconnected from hub 25 and jettisoned, thus maintaining rotor balance.

Having thus described the structure and operation of a preferred embodiment, some of the many advantages of applicant's invention should now be readily apparent. The apparatus described is relatively simple, affording a ready means for checking the integrity of helicopter blades prior to flight, and an instantaneous means for jettisoning a broken blade and the blade opposite thereto during flight. Power can be drawn from the existing aircraft power supply, and the remaining circuitry is relatively simple, reliable and economical to construct. Utilization of applicant's invention assures maintenance of rotor balance at all times during aircraft operation.

Obviously, many modifications and variations of the present invention are possible in light of the above teachings. It is therefore to be understood that within the scope of the appended claims, the invention may be practiced otherwise than as specifically described.

What is claimed is:

1. Apparatus for automatically jettisoning a pair of unbalanced rotor blades from a helicopter having a plurality of opposing rotor blade pairs attached to a rotor hub comprising:
   control means formed to be
   connected to each opposing pair of rotor blades and responsive to the occurrence of a discontinuity of rotor blade length for producing a plurality of output signals, each indicative of such occurrence in a respective opposing rotor blade pair; and
   a plurality of severing means, each formed to be connected to a respective opposing rotor blade pair, and connected to receive a corresponding output signal for actuation thereof when one of the rotor blades associated with an opposing rotor blade pair is discontinuous along the length thereof.

2. Apparatus as set forth in claim 1 wherein said control means further comprises:
   sensor means attached to each blade of the rotor blade pairs for sensing the continuity thereof.

3. Apparatus as set forth in claim 2 wherein said control means further comprises:
   switching means operatively connected to receive the output from said sensor means and operatively connected to actuate each of said severing means;
   indicator means operatively connected to said switching means for selectively indicating the continuity of each of the rotor blade pairs; and activation means operatively connected to receive a voltage for selectively applying the voltage to said switching means.

4. Apparatus as set forth in claim 3 wherein said switching means further comprises:
a pair of relays each having a coil, one normally open contact set and one normally closed contact set.

5. Apparatus as set forth in claim 4 further comprising:
each of said relay coils being operatively connected at one end thereof to the output of said sensor means and at the other end thereof to one side of said normally open contact set, the other side thereof being connected to said indicator means, and one side of said normally closed contact set being connected to the output of said activation means, the other side of said normally closed contact set being connected to said severing means.

6. Apparatus as set forth in claim 5 further comprising:
said indicator means including first and second contacts, said first contact being operatively connected to said other side of a first one of said relays normally open contact set and said second contact being operatively connected to said other side of a second one of said relays normally open contact set, a first member movable between said first and second contacts, and an indicator operatively connected to said first member; and
said activation means including a third contact operatively connected in common to said one side of each of said relays normally closed contact sets and a second member operatively connected to receive the voltage and movable to said third contact.

7. Apparatus as set forth in claim 1 wherein said severing means further comprises:
a pair of explosively actuated devices, each disposed between the hub and respective ones of the rotor blade pairs for imparting a force to the rotor blade radially outward from the hub.

8. Apparatus as set forth in claim 5 wherein said sensor means further comprises:
a continuous wire operatively attached to each rotor blade along the length thereof, one end of said wire in each opposing pair of rotor blades being connected to ground and the other end of said wire in each opposing pair of rotor blades being operatively connected to said one end of each respective relay coil.

9. Apparatus as set forth in claim 8 wherein said wire is integrally molded into the rotor blade.

10. Apparatus as set forth in claim 6 wherein said indicator is a light.

11. Apparatus for automatically disconnecting a pair of unbalanced radially depending objects from a rotating member having a plurality of opposing object pairs comprising:

control means formed to be connected to each opposing pair of objects and responsive to the occurrence of a discontinuity of object length for producing a plurality of output signals, each indicative of such occurrence in a respective opposing object pair; and
a plurality of severing means each formed to be connected to a respective opposing object pair, and connected to receive a corresponding output signal for actuatiion thereof upon the occurrence of a discontinuity in the object associated with an opposing object pair.

12. Apparatus as set forth in claim 11 wherein said control means further comprises:
sensor means operatively attached to the objects for sensing the continuity thereof.

13. Apparatus as set forth in claim 12 wherein said control means further comprises:
switching means operatively connected to receive the output from said sensor means and operatively connected to actuate said disconnect means;
indicator means operatively connected to said switching means for selectively indicating the condition of the objects; and
activation means operatively connected to receive a signal for selectively applying the signal to said switching means.

14. Apparatus as set forth in claim 13 wherein said switching means further comprises:
a relay having a coil, a normally open contact set and a normally closed contact set.

15. Apparatus as set forth in claim 14 further comprising:
said relay coil being operatively connected at one end thereof to the output of said sensor means and at the other end thereof to one side of said normally open contact set, the other side thereof being connected to said indicator means, and one side of said normally closed contact set being connected to the output of said activation means, the other side of said normally closed contact set being connected to said disconnect means.

16. Apparatus as set forth in claim 15 further comprising:
said indicator means including a first contact operatively connected to said other side of said relay normally open contact set, a first member movable to said first contact, and an indicator operatively connected to said first member; and
said activation means including a second contact operatively connected to said one side of said relay normally closed contact set and a second member operatively connected to receive the signal and movable to said second contact.

17. Apparatus as set forth in claim 16 wherein said indicator is a light.

* * * * *